United States Patent
Hadas et al.

(10) Patent No.: US 11,126,454 B2
(45) Date of Patent: Sep. 21, 2021

(54) ENFORCING RETENTION POLICIES WITH RESPECT TO VIRTUAL MACHINE SNAPSHOTS

(71) Applicant: Red Hat, Inc., Raleigh, NC (US)

(72) Inventors: Arik Hadas, Raanana (IL); Daniel Erez, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 140 days.

(21) Appl. No.: 16/518,832

(22) Filed: Jul. 22, 2019

(65) Prior Publication Data
US 2021/0026671 A1 Jan. 28, 2021

(51) Int. Cl.
*G06F 9/455* (2018.01)
(52) U.S. Cl.
CPC ........ *G06F 9/45558* (2013.01); *G06F 2009/45562* (2013.01); *G06F 2009/45579* (2013.01)
(58) Field of Classification Search
CPC ....... G06F 9/45558; G06F 2009/45562; G06F 2009/45579
See application file for complete search history.

(56) References Cited

U.S. PATENT DOCUMENTS

| | | | | |
|---|---|---|---|---|
| 8,538,919 | B1 * | 9/2013 | Nielsen | G06F 9/5077 707/610 |
| 9,514,170 | B1 * | 12/2016 | Tillotson | G06F 9/546 |
| 9,563,513 | B2 | 2/2017 | Huang et al. | |
| 9,772,898 | B2 | 9/2017 | Deshpande et al. | |
| 9,858,154 | B1 | 1/2018 | Lyadvinsky et al. | |
| 10,235,044 | B2 | 3/2019 | Patterson, III et al. | |
| 2011/0185068 | A1 * | 7/2011 | Schmieder | H04L 69/24 709/227 |
| 2018/0267985 | A1 | 9/2018 | Badey et al. | |
| 2019/0213123 | A1 * | 7/2019 | Agarwal | G06F 16/188 |
| 2020/0065195 | A1 * | 2/2020 | Benboubakeur | G06F 11/1458 |

OTHER PUBLICATIONS

"Manage Virtual Machine Snapshots," accessed at https://eis.utoronto.ca/~vss/vsscli/examples/snapshot.html, University of Toronto—ITS, 2019, 5 pgs.
Muntimadugu et al., "Administration Guide-Configuring and Managing Red Hat Gluster Storage," accessed at https://access.redhat.com/documentation/en-us/red_hat_gluster_storage/3.2/html-single/administration_guide/index, Red Hat customer Content Services, 2019, 465 pgs.
"Clustered Data ONTAP® 8.2-Logical Storage Management Guide," updated for 8.2.1, accessed at https://library.netapp.com/ecm/ecm_get_file/ECMP1368017, NetApp, Inc., 2014, 205 pgs.

* cited by examiner

*Primary Examiner* — Gregory A Kessler
(74) *Attorney, Agent, or Firm* — Lowenstein Sandler LLP

(57) ABSTRACT

Systems and methods for enforcing retention policies with respect to virtual machine snapshots are disclosed. In one implementation, a method may include identifying, by a virtualization manager, a snapshot of a virtual machine hosted by a host computer system. The method further includes retrieving, from metadata associated with the snapshot, a value of a time to live (TTL) parameter associated with the snapshot. The method also includes responsive to determining that the value of the TTL parameter satisfies a threshold criterion, deleting the snapshot.

18 Claims, 7 Drawing Sheets

ENFORCING RETENTION POLICIES WITH RESPECT TO VIRTUAL MACHINE SNAPSHOTS

TECHNICAL FIELD

Embodiments of the present invention relate generally to virtual machines, and more specifically to enforcing retention policies with respect to virtual machine snapshots based on their parameters.

BACKGROUND

Data centers may include clusters consisting of multiple hosts (e.g., physical servers) in racks. Hypervisors may operate on each host to create and run virtual machines (VMs). VMs emulate computer systems and may be referred to as guest machines. The hosts in the clusters may be connected via one or more wired (e.g., Ethernet) and/or wireless (e.g., WiFi) networks (e.g., the Internet, local area network).

BRIEF DESCRIPTION OF THE DRAWINGS

The present invention is illustrated by way of example, and not by way of limitation, and may be more fully understood with reference to the following detailed description when considered in connection with the figures in which.

DETAILED DESCRIPTION

Figure 1:
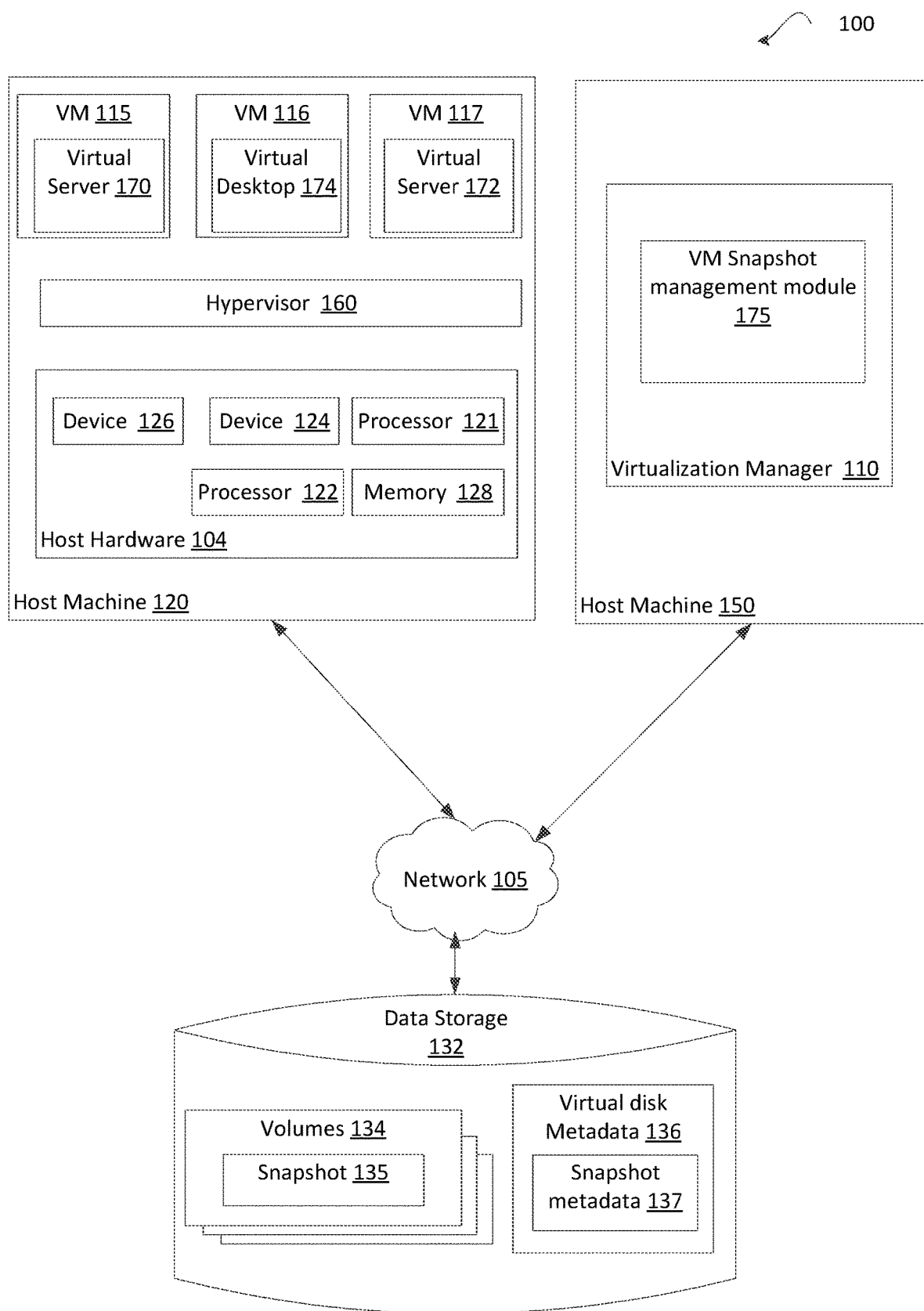
FIG. 1 is a block diagram of a computer system, in accordance with one implementation.

Described herein are methods and systems for enforcing retention policies with respect to virtual machine (VM) snapshots based on their parameters. Examples of the present disclosure refer to virtual machines for simplicity. However, the disclosure may be applicable to other virtualized execution environment in place of a virtual machine. A virtualized execution environment may be a virtual machine, a virtual container, a virtual OS, etc. A virtual machine snapshot may be viewed as a storage function allowing creation of a restore point of a virtual machine's operating system, applications, and data at a certain point in time. In other embodiments, VM snapshot may also include a dump of the memory state of the VM or screenshot of VM screens.

A snapshot saves the data present in a virtual machine disk image at the time of the snapshot creation. The data may be saved as a read-only volume, thus allows for a recovery to the disk image state as it existed at the time of the snapshot creation.

Snapshots of a virtual machine may be created by the host system as a restore point in the process of performing a specific operation. For example, before installing a device driver, the host operating system may create a snapshot of the virtual machine before installing the driver such that a recovery from the snapshot may be performed if the installation process does not succeed. The creation of VM snapshot may also be initiated by users as a restore point of the disk image state at the time of the snapshot creation. For example, a user may create a snapshot of the virtual machine before applying a security patch to the virtual machine. If the application of the security patch corrupts some settings of the VM, the user may recover the state of the VM to where it was before applying the security patch using the snapshot.

A VM snapshot may be created as an incremental snapshot or as a full snapshot. An incremental snapshot may refer to a snapshot that contains the changes in VM data that occurred since the creation of an earlier snapshot. In this case, the virtual disk image of the VM may be based on a series of snapshots. Such series of snapshots may be stored on separate volumes, referred to herein as the volume chain. For example, a first snapshot may be created based on an initial state of the virtual disk of the VM, and may be stored on a first volume. A second snapshot may be created based on the first snapshot and may additionally contain data changes made subsequent to the creation of the first snapshot, the second snapshot may then be stored in a second volume, and so on. In this case, because each snapshot in the series contains only the data changes from its parent snapshot, the VM may need to access every snapshot in the series of incremental snapshots, e.g. to perform I/O operations.

On the other hand, a full snapshot of the VM may also be created where the snapshot contains all the data, applications, and metadata of the VM with no dependency on any previously created snapshots of the VM.

During the lifetime of a VM, many snapshots of the VM may be created and stored on active storage devices. Storing many snapshots (that may or may not be used at a later time) may consume valuable storage space in an active storage device and may adversely impact the performance of the VM. In an illustrative example, a VM that has three incremental snapshots may need to access the three snapshots, possibly stored on three different storage devices, during the booting or other I/O operations of the VM. Accessing multiple snapshots, possibly hosted on different storage devices, may slow down the execution of the VM. Further, as time passes, some of the older snapshots in the series may no longer be needed by the VM and may be safely deleted or merged into other snapshots, but users may forget to delete old snapshots or are reluctant to manually delete snapshots that have been in the system for a long time. In the absence of a snapshot expiration policy or mechanism, more snapshots accumulate in the system with time, further contributing to the performance penalties and unnecessary consumption of storage space.

Snapshots that were automatically created by the system in the process of performing a given task may be automatically deleted if such an operation is specified by the corresponding script. For example, the virtualization system may run a script to install a device driver on the VM. A first step in the script may be to create a snapshot of the VM, then install the device driver. Upon a successful installation of the driver, the virtualization manager may delete the created snapshot as a subsequent step in the same script. While this process provides a way to remove unneeded snapshot data, it does not facilitate deletion of snapshots created manually by VM users or applications. Alternatively, the storage space consumed by VM snapshots may be preserved by moving snapshot data to backup storage devices. This approach however does not reduce the total number of snapshots associated with the VM, and thus does not reduce the VM performance penalty resulting from having to access a series of snapshots for various VM operations.

Aspects of the present disclosure address the above-noted and other deficiencies by providing systems and methods for enforcing retention policies with respect to virtual machine snapshots based on their parameters. A virtual machine snapshot may have metadata that includes various snapshot parameters, such as the date and time of creation, location of the snapshot, an identifier of the creator of the snapshot, etc. The virtualization manager may store, as part of the snapshot metadata, a parameter indicating the time to live (TTL) value for the snapshot. The TTL value may serve as an indication to the virtualization manager that the snapshot may be deleted after a certain time period, as indicated by the TTL value, measured from the time of creation of the snapshot. In an illustrative example, the TTL value may represent the number of units of time (e.g., seconds) from the time of creation of the snapshot. When the TTL expires, the virtualization manager may delete the snapshot from the virtualization system. In some implementations, if the snapshot is an incremental snapshot, the virtualization manager may merge the data from the snapshot into another snapshot in the system before deleting the snapshot.

In an illustrative example, the virtualization manager may execute a scheduled job to delete VM snapshots according to their respective TTL parameters. In this case, the periodic job may identify a snapshot associated with a VM and may retrieve the TTL value of the snapshot from the snapshot's metadata. The virtualization manager may then determine whether the TTL of the snapshot has expired. The TTL may be expired if the sum of value of the TTL parameter and the time of snapshot creation exceeds the current time of the host system. If the TTL of a snapshot has expired, the virtualization manager may delete the snapshot from the storage system. The periodic job may be configured to run repeatedly on a configurable schedule. For example, the periodic job may be schedule to run every four hours in a background thread running on the host system.

In another example, the virtualization manager may create a trigger associated with one or more snapshots of a virtual machine. A trigger may refer to an object in the virtualization environment that monitors a specific event and sends a notification upon detecting an occurrence of the event. The virtualization manager may create a trigger at the time of creation of a snapshot, and may assign to the trigger a "notification time" parameter that is based on the TTL of the snapshot. For example, the "notification time" of the trigger may be set to the sum of the creation time of the snapshot and the TTL value. When a second snapshot is created, the second snapshot may be associated with the same trigger as the first snapshot, if the notification time resulting from the second snapshot is within a predetermined time period of the notification time resulting from the first snapshot. For example, if the notification time resulting from the first snapshot is within 5 minutes of the notification time resulting from the second snapshot, the virtualization manager may determine that the first snapshot and the second snapshot may be associated to the same trigger. When the notification time of a trigger is reached, the trigger may send a notification to the virtualization manager that the TTL of at least one snapshot associated with the trigger has expired. When the virtualization manager receives the notification, it may execute a job to iterate through the snapshots associated with the trigger and evaluate whether the TTL of each snapshot has expired. If the TTL of a snapshot associated with the trigger has expired, the snapshot may be deleted. If all snapshots associated with a trigger have been deleted, the virtualization manager may delete the trigger.

In yet another example, the virtualization manager may create a sorted priority queue to keep track of TTL expiration of the snapshots in the virtualization system. A sorted priority queue may refer to a data structure where elements of data are added to the queue and the priority of each element is defined by the element's index in the queue. The data elements are placed in the queue such that an element with a higher priority is placed in the position preceding the position of another element with a lower priority. In this example, each element of the queue may contain a snapshot identifier and a TTL expiration value of the respective snapshot. A TTL expiration value may be calculated according to the following formula:

$$E=V+Tc$$

Where E refers to the TTL expiration value, V may be defined as the TTL value for the snapshot, and Tc may be defined as the creation time of the snapshot. In other words, the TTL expiration value may be calculated by adding the time of creation of the snapshot to the TTL value of the snapshot. The position of each element in the queue may be based on the TTL expiration value, such that an element with a shorter TTL expiration value may be interpreted as having a higher priority than a second element with a longer TTL expiration value. In this case, an identifier of the snapshot with the nearest TTL expiration would be the first element in the priority queue, followed by a second element storing an identifier of a second snapshot with the next nearest TTL expiration, and so on. The virtualization manager may periodically retrieve elements from the sorted priority queue on a predetermined schedule (e.g. every two minutes), and may evaluate the TTL expiration value against the current time of the host computer. If the TTL expiration value of an element is equal to or greater than the current time of the host machine, the snapshot associated with the priority queue element may be deleted.

This method of associating a time-to-live parameter with a VM snapshot upon its creation and automatically deleting snapshots upon the expiration of this parameter enables an improved performance of I/O operations of the virtual machines. This improvement is achieved because unneeded snapshots may be deleted automatically by the virtualization manager, thus minimizing the number of snapshots that need to be accessed for I/O operations as well as conserving storage space of the virtualization systems.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring embodiments of the present invention.

Various aspects of the above referenced methods and systems are described in details herein below are targeted at improving the functionality of the virtualization technology by improving the performance of the booting and I/O operations of virtual machines as well as preserving space on storage devices within virtualization systems.

FIG. 1 is a block diagram that illustrates an embodiment of a computer system 100, according to an embodiment of the present disclosure. Computer system 100 may comprise one or more host machines 120 and 150 and one or more data storage 132, each connected to a network 105. Host machine 120 may contain hypervisor 160 and may host one or more virtual machines (VMs) 115-117. Hypervisor 160 may provide a virtual operating platform for VMs 115-117 and may manage their execution. Host machines 120 and 150 may be rackmount servers, workstations, desktop computers, notebook computers, tablet computers, mobile phones, palm-sized computing devices, personal digital assistants (PDA), etc., or a combination thereof. Host machine 120 includes host hardware 104, which may include multiple processors 121, 122, multiple devices 124, 126, memory 128, and other hardware components. The memory 128 may include volatile memory devices (e.g., random access memory (RAM)), non-volatile memory devices (e.g., flash memory), and/or other types of memory devices. The host hardware 104 may also be coupled to external data storage 132 via a direct connection or a network 105. The network 105 may include a private network (e.g., a local area network (LAN), wide area network (WAN), intranet, etc.) and/or a public network (e.g., the Internet).

It should be noted that although, for simplicity, two host machines 120 and 150 are depicted in FIG. 1, in some other embodiments computer system 100 may comprise any number of host machines or a plurality of clusters of host machines.

Each of the devices 124, 126 may be a physical device that is internal or external to the host machine 120. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc.

Host machine 120 may host one or more virtual machines (VM) 115-117 (e.g., a single VM, one hundred VMs, etc.). A virtual machine 115-117 is a combination of guest software that uses an underlying emulation of host machine. Each VM 115-117 may include one or multiple virtual components such as virtual processors, virtual memory, virtual devices (e.g., virtual storage), and so forth. Each of these virtual components may map to a hardware component, such as a processor 121, 122, device 124, 126, external storage 132, or memory 128. Virtual machines 115-117 may be, for example, hardware emulation, full virtualization, para-virtualization, and operating system-level virtualization virtual machines. The guest software that runs in a VM 115-117 may include a guest operating system, guest applications, guest device drivers, etc. The virtual machines 115-117 may have the same or different guest operating systems, such as Windows®, Linux®, Solaris®, etc.

Some virtual machines 115-117 may include guest software that is accessible by clients (e.g., local clients and/or remote clients) to provide services to those clients. For example, VMs 115, 117 include virtual servers 170, 172 such as a virtual web server, a virtual data storage server, a virtual gaming server, a virtual enterprise application server, etc. A client may connect to a virtual sever 170, 172 to request one or more services provided by the virtual server 170, 172.

Similarly, VM 116 includes a virtual desktop 174. A virtual desktop 174 is a virtualized desktop computer, and thus may include storage, an operating system, applications installed on the operating system (e.g., word processing applications, spreadsheet applications, email applications, etc.), and so on. However, rather than these functions being provided and performed at a client, they are instead provided and performed by a virtual machine 116. A virtual desktop may represent an output (e.g., an image to be displayed) generated by a desktop application running within a virtual machine. Graphics data associated with the virtual desktop may be captured and transmitted to a client, where the virtual desktop may be rendered by a rendering agent and presented by a client application.

Host machine 150, in various embodiments, includes virtualization manager 110. Virtualization manager 110 may be one or more software modules being executed by host machine 150 for centralized management of one or more host machines 120 executing virtual machines 115-117. Virtualization manager 110 may comprise various interfaces, including an administrative interface, a reporting interface, and/or an application programming interface (API) to communicate with host machine 120. In certain embodiments, the virtualization manager 110 may include a VM snapshot management module 175. The VM snapshot management module 175 may access data storage 132 to retrieve, from snapshot metadata 137 of the virtual disk metadata 136, time to live (TTL) parameter and its respective value for a VM snapshot 135 to determine whether snapshot 135 may be deleted. In certain implementations, data storage 132 may store one or more virtual disk images in a series of volumes 134, as explained in more details in FIG. 2 herein below. Data storage 132 may further store information identifying the volumes in virtual disk metadata 136. For example, the virtualization manager 110 may manage the virtual disk file and a header of the virtual disk file may include information that identifies the volume chain information and parent/child information for each volume of the series of volumes 134. Such data managed by the virtualization manager 110 may be referred to as virtual disk metadata 136. Snapshot metadata 137 may reside in the virtual disk metadata 136 area and may store parameters identifying snapshot 135 (e.g. date and time of snapshot creation, location of the snapshot, an identifier of the creator of the snapshot, etc.)

In implementations of the disclosure, the virtualization manager may repurpose the snapshot metadata area to enable a manageable lifetime of VM snapshots by storing a TTL configuration parameter of snapshot 135 in the snapshot metadata area 137 of the virtual disk metadata 136. For example, the virtualization manager may store snapshot parameters and their respective values as <name=value>pairs.

Figure 2:
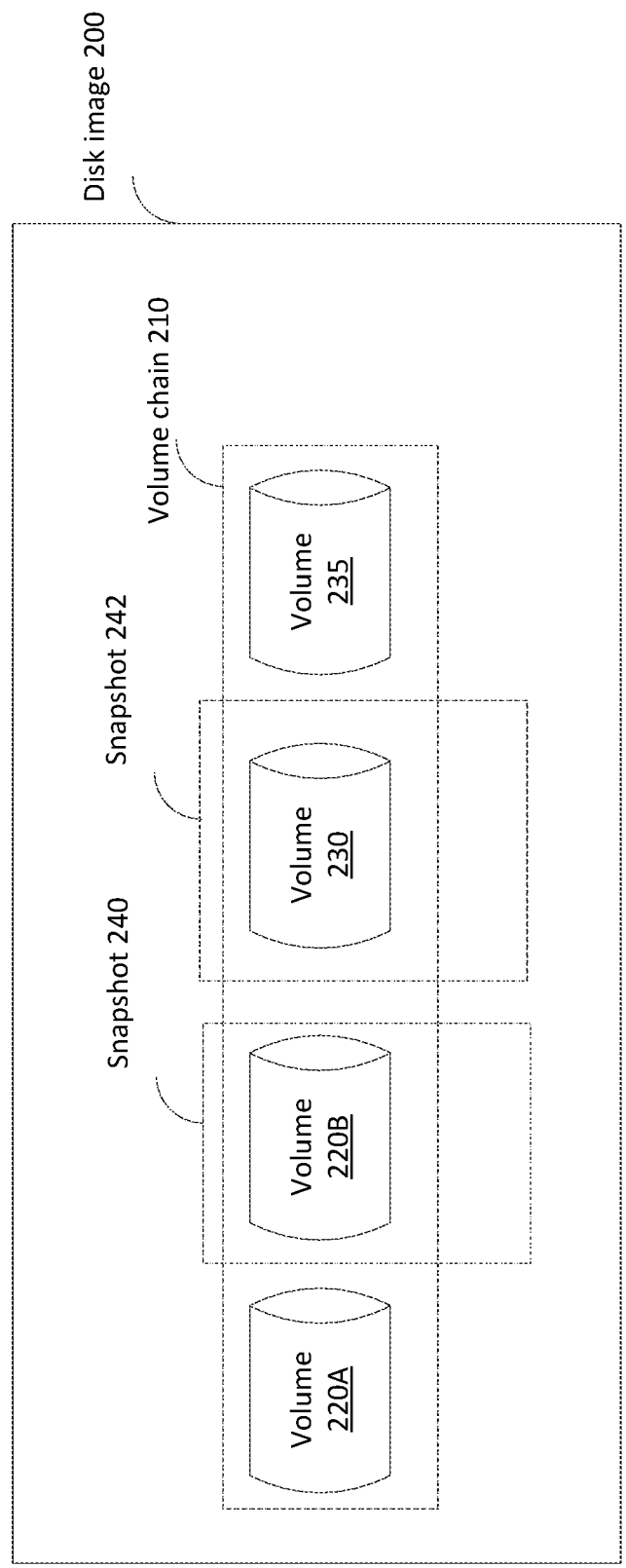
FIG. 2 schematically illustrates the creation of a virtual machine snapshot represented by chain of volumes of a disk image, according to one implementation of the disclosure.

FIG. 2 schematically illustrates creation of a virtual machine snapshot represented by chain of volumes of a disk image 200. Virtual disk image 200 may include a chain of volumes 210 comprising one or more copy-on-write (COW) volumes (which may also be referred to as "layers"). From the perspective of a virtual machine, these volumes appear as a single disk image, as hypervisor 160 presents the virtual disk to a virtual machine and implements the associated disk read-write operations.

Initially, a virtual machine disk image may only comprise one raw or COW volume, which may be made read-only before the first boot of the virtual machine. An attempt to write to a disk by a virtual machine may trigger adding a new COW volume ("layer") to the volume chain. The newly created volume may be made writable, and may only store disk blocks or files which have been modified or newly created by the virtual machine after the previous volume ("layer") has been made read-only. One or more volumes may be added to the volume chain during the lifetime of the virtual machine. Adding a new COW volume may be triggered by making the previous volume read-only (e.g., responsive to receiving a command via an administrative interface). This layered disk image structure may be utilized for creating virtual machine snapshots. A virtual machine snapshot, as described herein above, may allow creation of a restore point of a virtual machine's operating system, applications, and data at a certain point in time, by saving the data currently present in a virtual machine hard disk image as a read-only volume.

In an illustrative example, virtual machine snapshot 240 may be created (e.g., responsive to receiving a command via an administrative interface or an API interface) at some point in time by causing the most recent volume 220B in volume chain 200 to become read-only, and adding a new COW volume 230 to volume chain 200. Since the most recent volume 220B in the volume chain 200 has been made read-only, all write actions performed after snapshot 240 is taken are written to the newly added COW volume 230. Thus, snapshot 240 comprising the layered read-only volumes reflects the state of the virtual machine disk image at the time of snapshot 240 creation.

Newly created COW volume 230 initially only contains COW metadata (e.g., a reference to the previous volume in the volume chain, a volume format identifier, etc.). Data that is created by the virtual machine operation after the snapshot is taken is written to the newly created COW volume 230. When the virtual machine modifies the data that exists in one of read-only COW volumes 220A-B, the data is read from the read only COW volume 220A-B, and written into the newly created COW volume 230. The virtual disk device implemented by the hypervisor 160 locates the data by accessing, transparently to the virtual machine, each volume of the chain of volumes comprised by the snapshot, starting from the most recently added volume.

Similarly, another snapshot 242 may be created at some point in time after snapshot 240 has been created. The creation of snapshot 242 may cause the most recent volume 230 in volume chain 200 to become read-only, and a new COW volume 235 may be added by the virtualization manager to volume chain 200. Accordingly, all write actions performed after snapshot 242 is taken are written to the newly added COW volume 235, and read operation on the other hand may be performed against snapshot 240 or snapshot 242, depending on which COW volume comprises the data to be read. In this case, snapshot 240 may be viewed as a parent and snapshot 242 may be viewed as a child because snapshot 242 is an incremental snapshot to the parent snapshot 240.

In accordance with one or more aspects of the present disclosure, a virtual machine snapshot may be deleted from the virtualization system based on the TTL parameter value of the snapshot. In an illustrative example, VM snapshot management module 175 may receive, via an administrative portal interface or an API, a message identifying the snapshot to be deleted. In one implementation, before deleting the identified snapshot, VM snapshot management module 175 may merge the data from the identified snapshot with data of a second snapshot of the VM in the system in order to preserve the integrity of the VM data. The second snapshot may be another snapshot associated with the VM that was created before or after the identified snapshot. In another implementation, VM snapshot management module 175 may merge the data from the identified snapshot into the active volume associated with the VM, before deleting the identified snapshot. For example, if snapshot 242 has an expired TTL and may be deleted, VM snapshot management module 175 may merge data of snapshot 242 into volume 235 before deleting snapshot 242. In this case, volume 230 may be merged with volume 235.

FIGS. 3-6 are flow diagrams of various embodiments of methods related to enforcing retention policies with respect to virtual machine snapshots. The methods are performed by processing logic that may include hardware (circuitry, dedicated logic, etc.), software (such as is run on a general purpose computer system or a dedicated machine), or a combination of both. In one implementation, the methods may be performed by one or more VM snapshot deletion modules from one or more host machines, referred to herein as processing logic.

For simplicity of explanation, the methods are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. Each method described herein and/or each of its individual functions, routines, subroutines, or operations may be performed by one or more processing devices of the computer system (e.g., computer system 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

Figure 3:
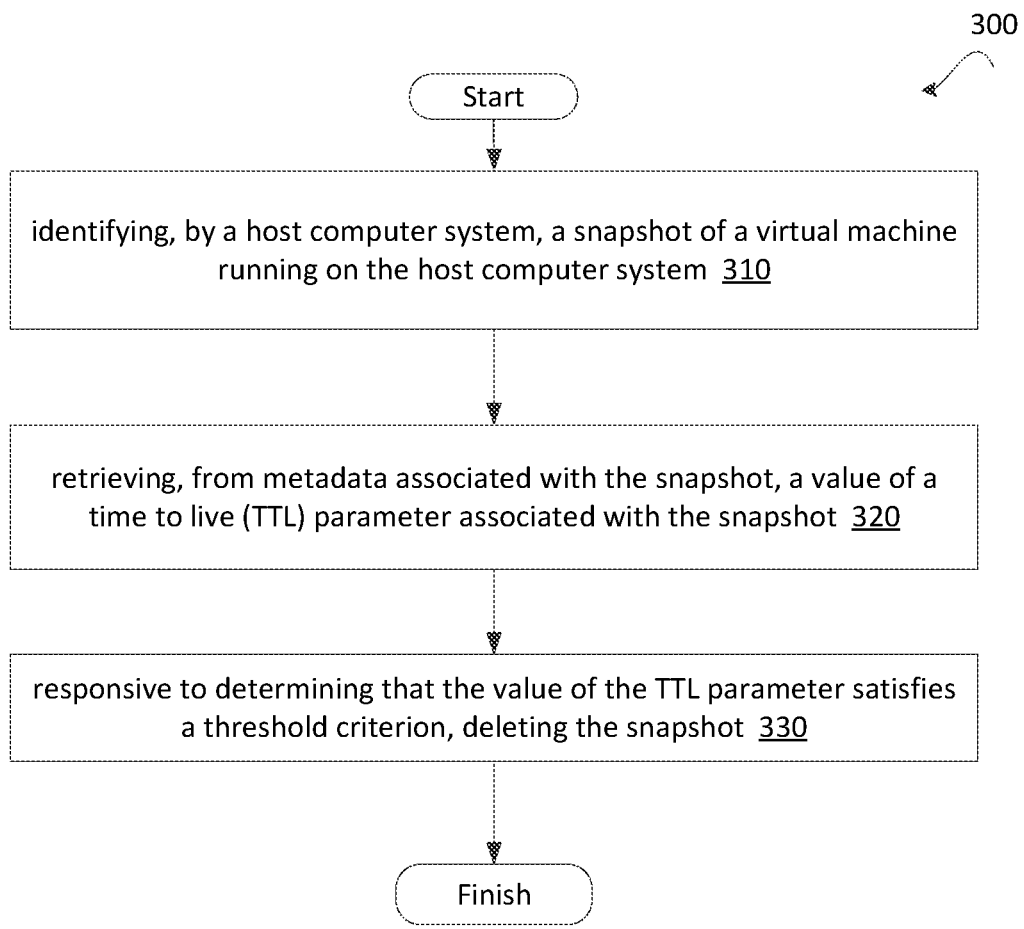
FIG. 3 is a flow diagram illustrating one embodiment for a method of enforcing retention policies with respect to virtual machine snapshots.

FIG. 3 is a flow diagram illustrating one embodiment for a method 300 of enforcing retention policies with respect to virtual machine snapshots. At block 310 of method 300, processing logic may identify a snapshot of a virtual machine running on the host computer system. The identification of the snapshot may be performed by executing a periodic job on a predetermined schedule to retrieve snapshots associated with the VM. For example, the periodic job may identify snapshots associated with a VM by accessing VM metadata stored on a virtual disk of the VM. For example, the periodic job may be schedule to run every four hours in a background thread running on the host system.

The identification of the snapshot may further be performed by receiving, from a trigger associated with the snapshot, a notification that the value of the TTL parameter associated with the snapshot satisfies a threshold criterion. A trigger may refer to an object in the virtualization environment that monitors a specific event and sends a notification upon detecting an occurrence of the event. A trigger may be created when a snapshot is created, and may have a notification time parameter that is based on the TTL of the snapshot. For example, the notification time of the trigger may be set to the sum of the creation time of the snapshot and the TTL value. When the notification time of a trigger is reached, the trigger may send a notification to the virtualization manager, identifying snapshots associated with the trigger, and informing the virtualization manager that the TTL of at least one snapshot associated with the trigger has expired.

The identification of the snapshot may also be performed by retrieving an identifier of the snapshot from a priority queue on a predetermined schedule. The virtualization manager may create a priority queue to keep track of TTL expiration of the snapshots in the virtualization system, sorted by the priority value. The priority value for each queue element may be based on the TTL expiration value, such that a shorter TTL expiration may be interpreted as a higher priority. In this case, a snapshot with the shortest TTL expiration may be the first element in the priority queue. The processing logic may periodically retrieve elements, identifying snapshots, from the top of the sorted priority queue on a predetermined schedule (e.g. every two minutes).

At block 320, processing logic may retrieve, from metadata associated with the identified snapshot, a value of a time to live (TTL) parameter associated with the snapshot. In certain implementations, a value for the TTL parameter associated with the snapshot may have been stored in a snapshot metadata area of the virtual disk when the snapshot was created. The TTL value may indicate to the virtualization manager that the snapshot may be deleted after a certain time period, as indicated by the TTL value, measured from the time of creation of the snapshot. In an illustrative example, the TTL value may represent the number of units of time (e.g., seconds) from the time of creation of the snapshot.

At block 330, responsive to determining that the value of the TTL parameter satisfies a threshold criterion, processing logic may delete the snapshot. Satisfying the threshold criterion may comprise determining that the sum of a first number derived from a creation date and time of the snapshot and the value of the TTL parameter of the snapshot is greater than or equal to a second value derived from the current date and time of the host computer. When the threshold criterion is satisfied, the TTL may be determined to have expired and the snapshot may be automatically deleted by the processing logic. In one implementation, if the TTL value is null, the processing logic may determine that the snapshot does not have a time to live value and thus may determine that the snapshot may continue to exist in the virtualization environment until it is manually deleted. In certain implementation, before deleting the snapshot the data of the snapshot may be merged with data of a second snapshot of the virtual machine in order to preserve the state of the VM. Further, in certain implementations, the processing logic may determine that if the snapshot is the only snapshot associated with the VM, the processing logic may abort the deletion process and may keep the snapshot in the virtualization system even if the threshold criterion has been satisfied. Alternatively, in other implementations, the processing logic may determine that if there is an active volume associated with the VM, a snapshot may be deleted even if it is the only snapshot associated with the VM.

Figure 4:
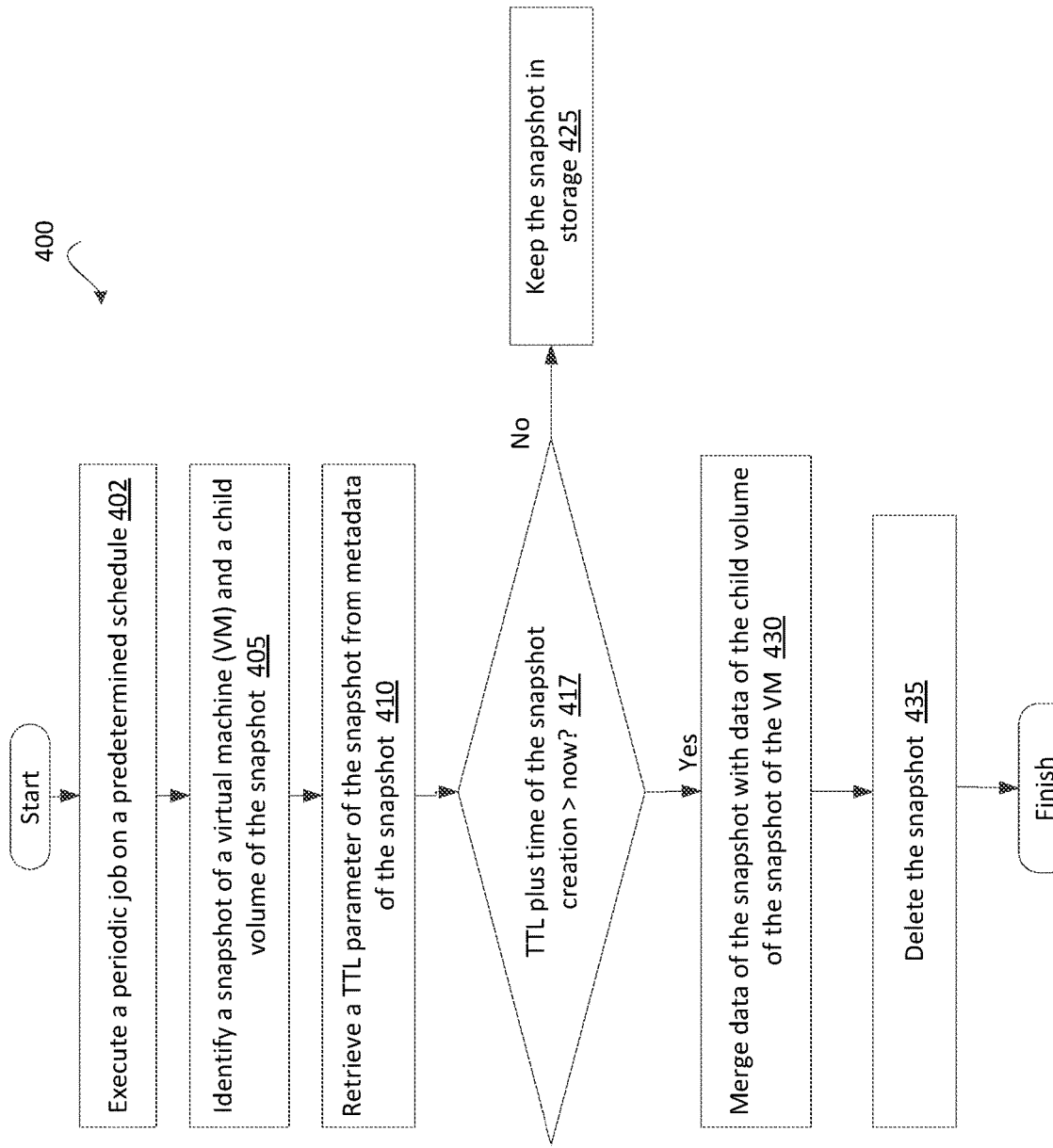
FIG. 4 is a flow diagram illustrating a method of enforcing retention policies with respect to virtual machine snapshots via executing a periodic job, according to one implementation of the disclosure.

FIG. 4 is a flow diagram illustrating an embodiment for a method 400 of enforcing retention policies with respect to virtual machine snapshots via executing a periodic job. At block 402 of method 400, processing logic may execute a scheduled job on a predetermined schedule to retrieve snapshots associated with the VM and determine whether snapshots associated with the VM may be deleted based on their TTL value. In an illustrative example, the scheduled job may identify snapshots associated with a VM by accessing VM metadata stored on a virtual disk of the VM. The job may be scheduled to run periodically for the lifetime of the VM (e.g. every four hours in a background thread running on the host system).

At block 405, the processing logic may identify a snapshot of the VM and a child volume of the snapshot. A child volume to the snapshot may refer to a volume that may be created after the creation of the snapshot and is incremental to the parent snapshot. At block 410, the processing logic may retrieve, from metadata associated with the snapshot, a value of a TTL parameter associated with the snapshot. In certain implementations, a value for the TTL parameter associated with the snapshot may have been stored in a snapshot metadata area of the virtual disk when the snapshot was created. The TTL value may indicate to the virtualization manager that the snapshot may be deleted after a certain time period. In an illustrative example, the TTL value may be the time to live in minutes from the time of creation of the snapshot.

At blocks 417, the processing logic may determine whether or not the TTL of the snapshot has expired by determining whether the sum of the value of the TTL and the creation date and time of the snapshot is equal to or exceeds the current date and time of the host machine. Responsive to determining that the TTL of the snapshot has expired at block 430, the processing logic may merge the data from the snapshot with data of the snapshot child volume before deleting the snapshot. For example, if the VM has two incremental snapshots A and B, and an active volume C where A is the parent of B and B is the parent of C, one of the snapshots may have an expired TTL value before the other snapshot. If snapshot B has an expired TTL and is ready to be deleted, in order to preserve the integrity of the VM data, the data from snapshot B may be merged with the data of volume C. Further, volume C may be updated to point to snapshot A as its parent snapshot, replacing snapshot B, in the series of incremental snapshots.

At block 435, the snapshot may be deleted from the virtualization system due to its expired TTL. On the other hand, at block 425, if the processing logic determines that the TTL of the snapshot has not expired, the snapshot may not be automatically deleted, and may continue to reside and be used in the virtualization system. In one implementation, the processing logic may determine that the TTL of the snapshot has not expired because the sum of the value of the TTL and the creation date and time of the snapshot is less than the current date and time of the host machine.

Figure 5:
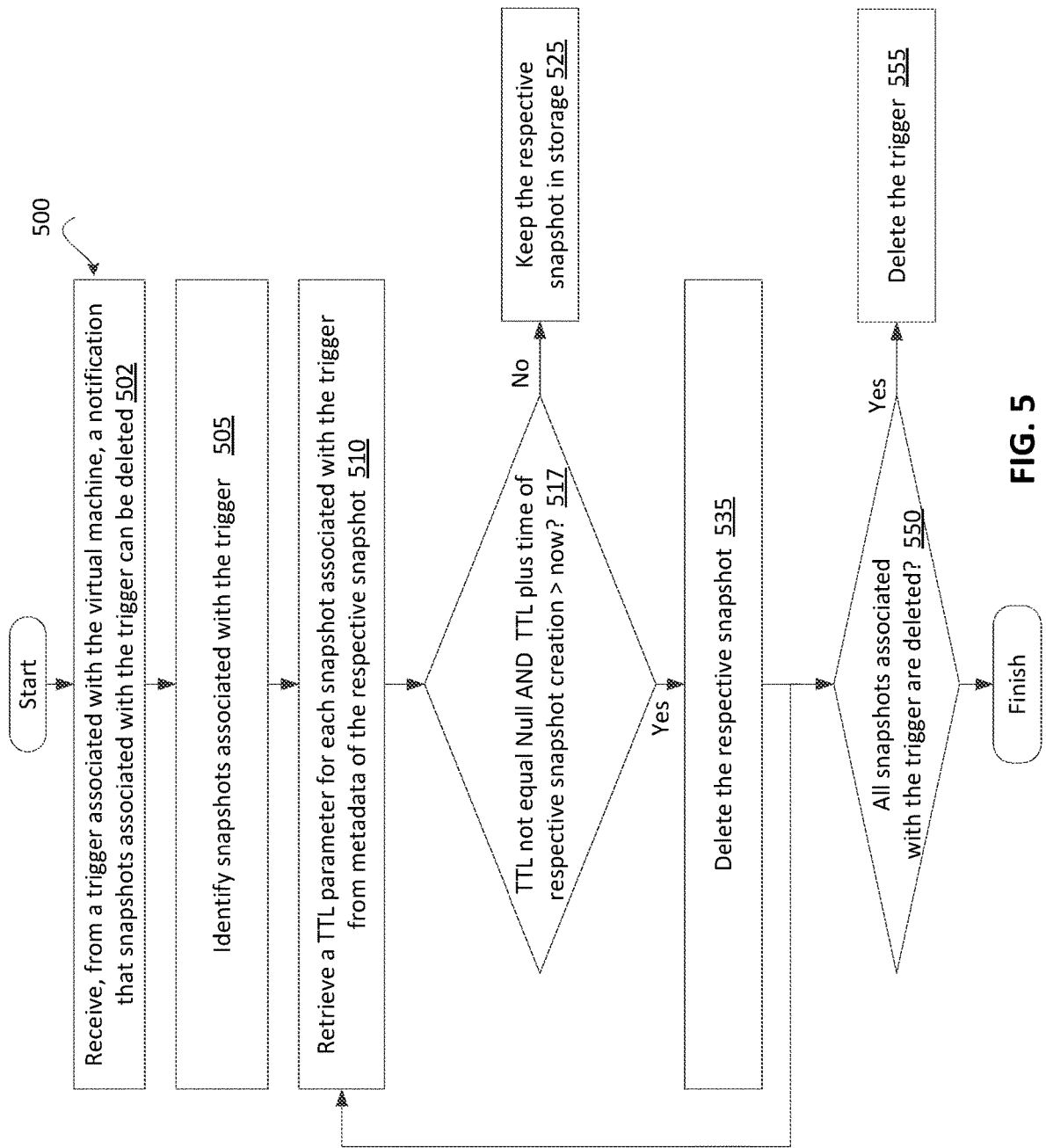
FIG. 5 is a flow diagram illustrating a method of enforcing retention policies with respect to virtual machine snapshots upon receiving a trigger notification, according to one implementation of the disclosure.

FIG. 5 is a flow diagram illustrating an embodiment for a method 500 of enforcing retention policies with respect to virtual machine snapshots upon receiving a trigger notification. At block 502 of method 500, processing logic may receive, from a trigger associated with the VM, a notification that snapshots associated with the trigger may be deleted. The virtualization manager may create a trigger associated with one or more snapshots of a virtual machine. A trigger may refer to an object in the virtualization environment that monitors an event and may send a notification upon the occurrence of the event. A trigger may be created when a snapshot is created, and may have a notification time parameter that is based on the TTL of the snapshot. For example, the notification time of the trigger may be set to the sum of the creation time of the snapshot and the TTL value. When the notification time of a trigger is reached, the trigger may send a notification to the virtualization manager that the TTL of at least one snapshot associated with the trigger has expired.

At block 505, when the processing logic receives the trigger notification, it may execute a job to iterate through the snapshots associated with the trigger. In certain implementations, multiple snapshots may be associated with one trigger, For example, when a second snapshot is created, the second snapshot may be associated with the same trigger as the first snapshot, if the notification time resulting from the second snapshot is close to the notification time resulting from the first snapshot (e.g. the two notification times are within five minutes of each other).

At block 510, the processing logic may retrieve a TTL parameter for each snapshot associated with the trigger from metadata of the respective snapshot and evaluate whether the TTL of each snapshot has expired at 517. In one implementation, if the TTL value of a snapshot is null, the processing logic may determine that the snapshot does not have a time to live limitation, and thus may determine that the snapshot may continue to exist in the virtualization environment until it is manually deleted. If the value of the TTL of a snapshot is not null and the sum of the value of the TTL and the creation date and time of the snapshot is equal to or exceeds the current date and time of the host machine, then the processing logic at 535 may determine that the TTL has expired and may delete the snapshot.

On the other hand, if the TTL is null or the TTL has a value that has not expired yet, the processing logic at 525 may keep the snapshot in storage for use by the VM. The processing logic may then proceed to loop through the next snapshot that is associated with the VM trigger to evaluate if it may be deleted. At block 550, after each snapshot associated with the trigger has been evaluated for expired TTL, the processing logic may determine whether all snapshots associated with the trigger has been deleted. If the trigger no longer has associated snapshots, the processing logic may delete the trigger at 555.

Figure 6:
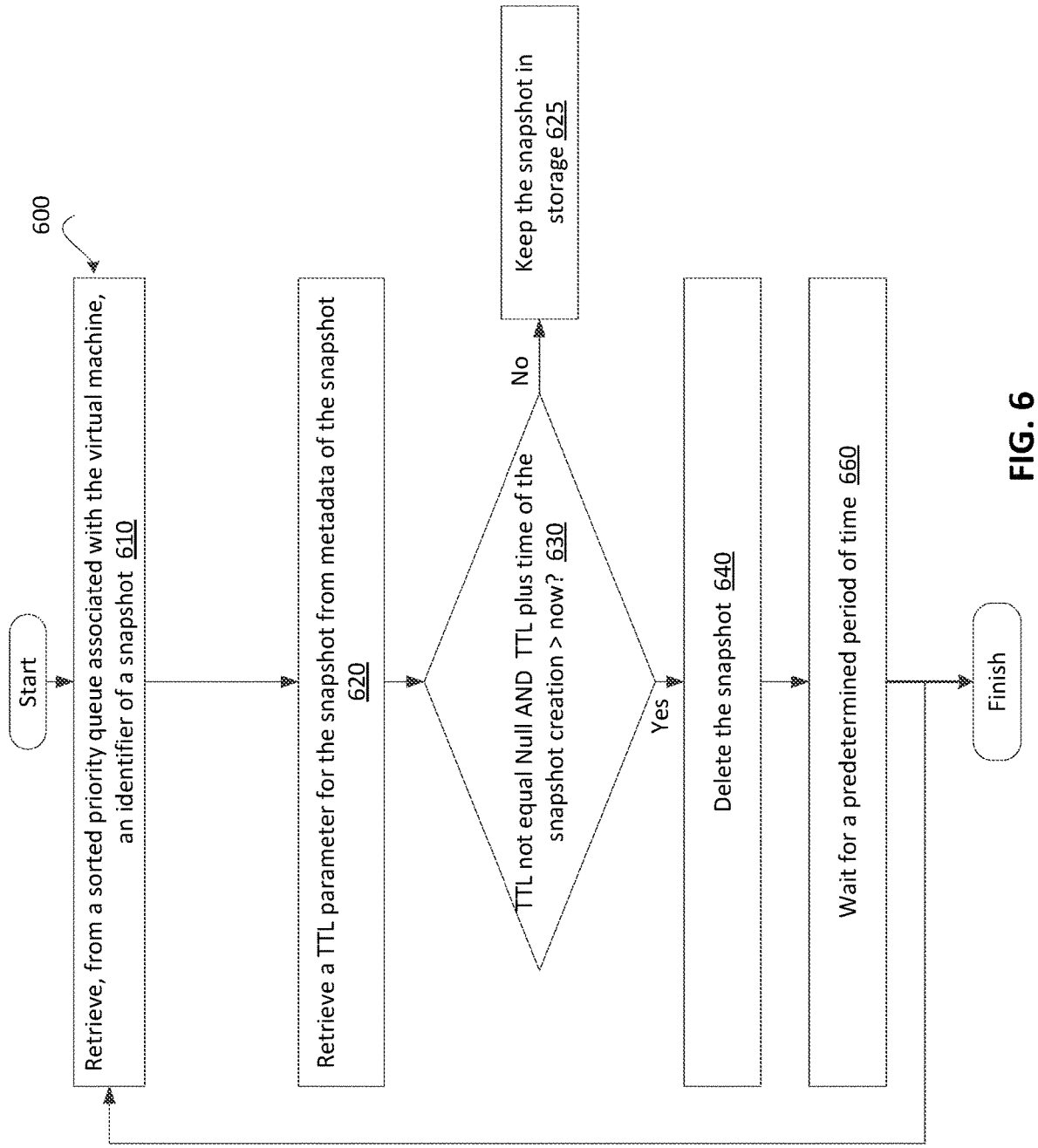
FIG. 6 is a flow diagram illustrating a method of enforcing retention policies with respect to virtual machine snapshots using a sorted priority queue, according to one implementation of the disclosure.

FIG. 6 is a flow diagram illustrating an embodiment for a method 600 of enforcing retention policies with respect to virtual machine snapshots using a sorted priority queue. At block 610 of method 600, processing logic may retrieve, from a sorted priority queue associated with the virtual machine, an identifier of a snapshot. The virtualization manager may create a priority queue to keep track of TTL expiration of snapshots in the virtualization system, sorted by the priority value. A sorted priority queue may refer to a data structure where elements of data are added to the queue and the priority of each element is defined by the element's index in the queue. The data elements are placed in the queue such that an element with a higher priority is placed on top of another element with a lower priority. A data element in the queue may contain a snapshot identifier and a TTL expiration value of the respective snapshot. The priority for each element in the queue may be based on the TTL expiration value, such that an element with a shorter TTL expiration value may be interpreted as having a higher priority than a second element with a longer TTL expiration value. In this case, an identifier of the snapshot with the nearest TTL expiration would be the first element in the priority queue, followed by a second element storing an identifier of a second snapshot with the next nearest TTL expiration.

In other implementations, sorting of the priority queue may be determined based on a second snapshot parameter (e.g. a delete priority flag) indicating how soon should the snapshot be deleted after its TTL has expired. For example, the virtualization manager may place a snapshot that should be deleted as close as possible to its expiration time (e.g. has a set delete priority flag) higher in the priority queue than a second snapshot that has a delete priority flag not set.

At block 620, the processing logic may retrieve a value of the TTL parameter of the snapshot from metadata of the snapshot and evaluate whether the TTL of the snapshot has expired at 630. As explained in more details herein above, the processing logic at 630 may determine that if the TTL expiration value of an element is equal to or greater than the current time of the host machine, the snapshot associated with the priority queue element may be deleted at 640. The TTL expiration value may be calculated according to the following formula:

$$E=V+Tc$$

Where E may be defined as the TTL expiration value, V may be defined as the TTL value for the snapshot, and Tc may be defined as the creation time of the snapshot. In other words, the TTL expiration value may be calculated as the result of adding the time of creation of the snapshot to the TTL value of the snapshot.

On the other hand, if the TTL is null or the TTL expiration value is less than the current time at the host machine, the processing logic at 625 may keep the snapshot in storage for use by the VM.

At block 660, the processing logic may wait for a predetermined period of time before retrieving the next element from the top of the sorted priority queue. For example, the processing logic may wake up a background thread (e.g. every two minutes) to periodically retrieve snapshot identifiers from the top of the sorted priority queue to evaluate whether or not the snapshot may be deleted, as described in more details herein above.

Figure 7:
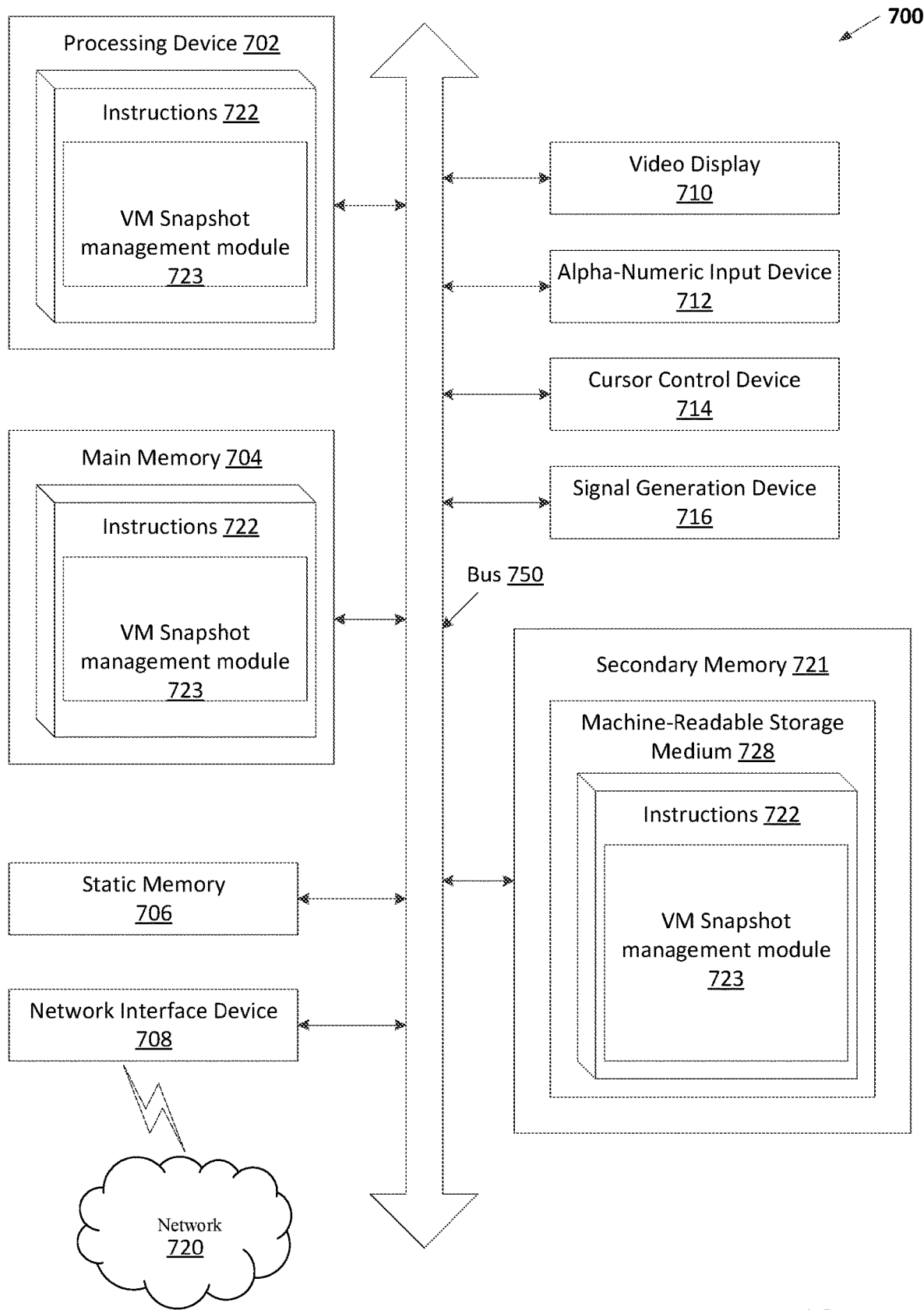
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. The computer system 700 may correspond to a computer system 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device), which communicate with each other via a bus 750.

The processing device 702 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 702 may therefore include multiple processors. The processing device 702 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 721 may include a machine-readable storage medium (or more specifically a computer-readable storage medium) 728 on which is stored one or more sets of instructions 722 embodying any one or more of the methodologies or functions described herein (e.g., VM snapshot management module 723). The instructions 722 may also reside, completely or at least partially, within the main memory 704 and/or within the processing device 702 during execution thereof by the computer system 700; the main memory 704 and the processing device 702 also constituting machine-readable storage media.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a transitory medium such as a carrier wave that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIG. 1) may be implemented as discrete hardware components or integrated in the functionality of hardware components such as ASICS, FPGAs, DSPs or similar devices. In addition, the modules may be implemented as firmware or functional circuitry within hardware devices. Further, the modules may be implemented in any combination of hardware devices and software components, or only in software.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "generating", "determining", "using", "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but may be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
identifying, by a virtualization manager, a snapshot of a virtual machine hosted by a host computer system;
retrieving, from metadata associated with the snapshot, a value of a time to live (TTL) parameter associated with the snapshot; and
responsive to determining that the value of the TTL parameter satisfies a threshold criterion:
identifying a child volume of the virtual machine;
merging the snapshot with the child volume; and
deleting the snapshot.

2. The method of claim 1, wherein deleting the snapshot further comprises:
identifying at least a second snapshot associated with the virtual machine; and
merging the snapshot with the second snapshot.

3. The method of claim 1, wherein determining that the value of the TTL parameter satisfies the threshold criterion further comprises:
computing a first value derived from a creation time of the snapshot;
computing a second value derived from a current time of the host computer; and
determining that a sum of the value of the TTL parameter and the first value is greater than the second value.

4. The method of claim 1, wherein identifying the snapshot further comprises: executing a scheduled job to retrieve snapshots associated with the virtual machine.

5. The method of claim 1, wherein identifying the snapshot further comprises: receiving, from a trigger associated with the snapshot, a notification that the value of the TTL parameter associated with the snapshot satisfies the threshold criterion.

6. The method of claim 1, wherein identifying the snapshot further comprises: retrieving an identifier of the snapshot from a priority queue.

7. A computing device comprising:
a memory; and
a processing device coupled to the memory, wherein the processing device is to:
identify a snapshot of a virtual machine hosted by a host computer system;
retrieve, from metadata associated with the snapshot, a value of a time to live (TTL) parameter associated with the snapshot; and
responsive to determining that the value of the TTL parameter satisfies a threshold criterion:
identify a child volume of the virtual machine;
merge the snapshot with the child volume; and
delete the snapshot.

8. The computing device of claim 7, wherein to delete the snapshot, the computing device is further to:
identify at least a second snapshot associated with the virtual machine; and
merge the snapshot with the second snapshot.

9. The computing device of claim 7, wherein to determine that the value of the TTL parameter satisfies the threshold criterion, the computing device is further to:
compute a first value derived from a creation time of the snapshot;
compute a second value derived from a creation time of the host computer; and
determine that a sum of the value of the TTL parameter and the first value is greater than the second value.

10. The computing device of claim 7, wherein to identify the snapshot, the computing device is further to:
execute a scheduled job to retrieve snapshots associated with the virtual machine.

11. The computing device of claim 7, wherein to identify the snapshot, the computing device is further to:
receive, from a trigger associated with the snapshot, a notification that the value of the TTL parameter associated with the snapshot satisfies the threshold criterion.

12. The computing device of claim 7, wherein to identify the snapshot, the computing device is further to:
retrieve an identifier of the snapshot from a priority queue.

13. A computer-readable storage medium having instructions that, when executed by
a processing device, cause the processing device to:
identify a snapshot of a virtual machine hosted by a host computer system;
retrieve, from metadata associated with the snapshot, a value of a time to live (TTL) parameter associated with the snapshot; and
responsive to determining that the value of the TTL parameter satisfies a threshold criterion:
identify a child volume of the virtual machine;
merge the snapshot with the child volume; and
delete the snapshot.

14. The computer-readable storage medium of claim 13, wherein to determine that the value of the TTL parameter satisfies the threshold criterion, the computer-readable storage medium is further to:
compute a first value derived from a creation time of the snapshot;
compute a second value derived from a current time of the host computer; and
determine that a sum of the value of the TTL parameter and the first value is greater than the second value.

15. The computer-readable storage medium of claim 13, wherein to delete the snapshot, the computer-readable storage medium is further to:
merge the snapshot with a second snapshot of the virtual machine.

16. The computer-readable storage medium of claim 13, wherein to identify the snapshot, the computer-readable storage medium is further to:
execute a scheduled job to retrieve snapshots associated with the virtual machine.

17. The computer-readable storage medium of claim 13, wherein to identify the snapshot, the computer-readable storage medium is further to:
receive, from a trigger associated with the snapshot, a notification that the value of the TTL parameter associated with the snapshot satisfies the threshold criterion.

18. The computer-readable storage medium of claim 13, wherein to identify the snapshot, the computer-readable storage medium is further to:
retrieve an identifier of the snapshot from a priority queue.

* * * * *